United States Patent [19]
Ashrawi et al.

[11] Patent Number: 5,273,673
[45] Date of Patent: Dec. 28, 1993

[54] ANTI-ICING COMPOSITIONS HAVING ALKYLPHENOL ETHOXYLATE NONIONIC SURFACTANT AND ALKYLARYL SULFONATE HYDROTROPE

[75] Inventors: Samir S. Ashrawi; David A. Coffey, both of Austin, Tex.

[73] Assignee: Texaco Chemical Company, White Plains, N.Y.

[21] Appl. No.: 937,011

[22] Filed: Aug. 31, 1992

[51] Int. Cl.$^5$ ................................................ C09K 3/18
[52] U.S. Cl. ........................................ 252/70; 106/13
[58] Field of Search ...................... 252/70, 71; 106/13

[56] References Cited

U.S. PATENT DOCUMENTS

| | | | |
|---|---|---|---|
| 3,412,030 | 11/1968 | Wahlberg | 252/70 |
| 4,358,389 | 11/1982 | Konig-Lumer et al. | 252/70 |
| 4,744,913 | 5/1988 | Salvadore et al. | 252/70 |
| 4,954,279 | 9/1990 | Ma et al. | 252/70 |
| 5,118,435 | 6/1992 | Nieh | 252/70 |

FOREIGN PATENT DOCUMENTS 1272464 4/1972 United Kingdom ................. 252/70

OTHER PUBLICATIONS

Draft #6 SAE ref J89A2 "Proposed Aerospace Material Specification for Fluid, Aircraft Deicing/Anti-Icing (SAE Type 11)", Jun. 6, 1991.

Primary Examiner—Paul Lieberman
Assistant Examiner—Necholus Ogden
Attorney, Agent, or Firm—James L. Bailey; Kenneth R. Priem; David L. Mossman

[57] ABSTRACT

Anti-icing compositions, such as used on aircraft wing surfaces, may be thickened using a blend of a polyacrylic acid and a copolymer of polyacrylic acid with a vinyl monomer, where the copolymer acts as a thickener modifier. Additional advantages are obtained when a low molecular weight nonionic alkylphenol ethoxylate surfactant is used in conjunction with an alkylaryl sulfonate hydrotrope, as additives. This latter combination of additives gives anti-icing compositions with increased holdover times with no degradation of other properties. The compositions also contain an alkylene glycol component, such as propylene glycol, diethylene glycol and mixtures thereof. These compositions retain a high viscosity, even when diluted with water, and exhibit a highly pseudoplastic rheology indicating desirable flow off characteristics.

22 Claims, No Drawings

ANTI-ICING COMPOSITIONS HAVING ALKYLPHENOL ETHOXYLATE NONIONIC SURFACTANT AND ALKYLARYL SULFONATE HYDROTROPE

FIELD OF THE INVENTION

The invention relates to anti-icing compositions, and, in one aspect, more particularly relates to anti-icing compositions containing a combination of a surfactant and a hydrotrope, which compositions are thereby especially suitable for use as aircraft wing anti-icers due to increased holdover times.

BACKGROUND OF THE INVENTION

Liquid substances applied to the airfoil surfaces of aircraft to prevent their freezing and being covered with ice in inclement weather are well-known and are important to ensure safe and proper take off of aircraft in winter. It is also well-known that aircraft departures are often delayed under such conditions and the anti-icing formulations must often be reapplied if the plane must wait an extended period. These liquids must also be stable not only through temperature extremes, but also during pumping and spraying (application to the wings) and the taxiing phases of the take off procedure and also must adhere to the wing surfaces during taxiing and ground winds. The fluids may also be diluted somewhat through intentional dilution with water, such as during particularly cold conditions below the expected operating temperatures of the fluids to enable their application, or incidentally as through freezing rain conditions. In addition to these demands, the anti-icing materials must also change characteristics, becoming much less viscous, and flow off the wing surfaces during the relatively high shear conditions of take off. Such compositions are also useful in the de-icing or anti-icing of other surfaces besides air foils, for example, runway and vehicle roadway surfaces.

Other anti-icing compositions are known. For example, U.S. Pat. No. 4,744,913 describes an anti-icing and de-icing agent, based on glycols and water and having crosslinked acrylic polymers useful as a thickener, and also containing customary corrosion inhibitors, surfactants belonging to the group of alkali metal alkylarylsulfonates and a neutralizing agent to adjust the pH to a basic value. The agents contains, as the thickeners, two selected crosslinked acrylic polymers in a specific ratio by weight to one another, namely a selected crosslinked acrylic acid or alkali metal acrylate homopolymer and a selected crosslinked acrylic acid/acrylamide or alkali metal acrylate/acrylamide copolymer in a ratio by weight of 2:1 to 10:1. The neutralizing agent may be three compounds, each in a selected amount, namely ammonia, monoethanolamine, diethanolamine and/or triethanolamine as the first alkaline compound, potassium hydroxide as the second alkaline compound and a further alkali metal hydroxide as the third alkaline compound. The new agent was found to exhibit the particular advantage that it has a relatively low viscosity even at arctic temperatures and low shear rates, which ensures rapid and complete runoff of the agent at the take-off of the aircraft even under extreme conditions.

Another liquid agent for de-icing and protecting against icing-up is described in U.S. Pat. No. 4,358,389, by means of which it is possible, in particular, to free the metal surface of aircraft rapidly and completely from ice hoar-frost, snow and the like, and to protect the surface against further build-up for a relatively long period. The agent is essentially composed of several components, namely of (a) glycols, (b) water, (c) thickeners, (d) substances insoluble in water, (e) surface-active agents, (f) corrosion inhibitors and (g) alkaline compounds. The quantities are very specific in each case, the quantity of the components (a) and (b) being at least 94%, relative to the total weight of the agent. Its pH is 7.5 to 10. The component (c) thickeners are crosslinked polyacrylates described in the patent in further detail and also in U.S. Pat. No. 2,923,692.

U.S. Pat. No. 4,954,279 describes a composition consisting of a microemulsion of oil in a water/glycol solution containing certain thickening agents (e.g. natural and artificial gums, cellulose ethers, carboxymethylcellulose and hydroxyethylcellulose), emulsifiers, substantially water-insoluble, partially polar oils, and alkanolamines to provide the desirable viscosity and shear stability needed to give a composition having effective de-icer and anti-icing properties. The emulsifier may be anionic surfactants, nonionic surfactants and mixtures thereof, such as organo-phosphates, phosphonates, sulfates, sulfonates, fatty acid salts, alcohols, phenols, amines, fatty acids and their alkoxylated derivatives.

A composition for accelerating the melting of layers of snow or ice using anionic, nonionic and cationic wetting agents in the absence of other melt-accelerating agents is described in U.S. Pat. No. 3,412,030. The anionic wetting agent may be an alkyl aryl sulfonate, having at least one alkyl group having 12 to 15 carbon atoms. The nonionic wetting agent is selected from the group consisting of alkyl oxyethers and esters and thioethers and esters having the formula:

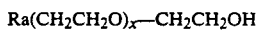

where A is selected from the group consisting of ethereal oxygen and sulfur, amino, carboxylic ester and thiocarboxylic ester groups, R is a saturated or unsaturated hydrocarbon group or an aralkyl group of 8 to 18 carbon atoms and x is from 1–20.

British Patent Specification 1,272,464 discusses a de-icing fluid having an aqueous solution of an alcohol component which comprises one or more of ethylene glycol, propylene glycol and glycerol; a polyethylene glycol ether of a diisoalkylphenol; and a thickening agent which is a copolymer of acrylic acid or methacrylic acid.

Anti-icing compositions thickened using a blend of a polyacrylic acid and a copolymer of polyacrylic acid with a vinyl monomer, where the copolymer acts as a thickener modifier, similar to that used in the present invention is described in U.S. Pat. No. 5,118,435 to Edward C. Nieh of Texaco Chemical Company, incorporated by reference herein. The two polymers form a thickener blend. The polyacrylic acid may have a weight average molecular weight of from about 2,500,000 to about 3,500,000 and be slightly crosslinked with a diene monomer. The compositions also contain an alkylene glycol component, such as propylene glycol, diethylene glycol and mixtures thereof. These compositions retain a high viscosity, even when diluted with water, and exhibit a highly pseudoplastic rheology indicating desirable flow off characteristics. A neutralizing agent to neutralize at least partially the carboxylic acid groups of the thickening blend is also preferably included.

There remains a need for thickened aircraft anti-icing compositions that exhibit all the rheological properties that yield the performance characteristics described in the first paragraph of the Background of the Invention herein. It would also be advantageous if the fluid retained a high viscosity as the composition is diluted with water. The anti-icing fluids should also remain stable during shear due to pumping and/or spraying, and should be physically stable on a surface such as an airfoil for relatively long periods of time to delay or avoid re-application of the compositions during departure holdovers, particularly during freezing rain, or generally humid and cold conditions, for example.

SUMMARY OF THE INVENTION

Accordingly, it is an object of the present invention to provide an antifreeze composition that can retain high viscosity as the composition is diluted with water.

It is another object of the present invention to provide an antifreeze composition which exhibits a highly pseudoplastic rheology so that it would have desirable flow off characteristics when used as an anticraft anti-icing composition.

Another object of the invention is to provide an antifreeze composition which is shear stable during pumping and/or spraying operations.

In carrying out these and other objects of the invention, there is provided, in one form, an anti-icing composition having an alkylene glycol component; a thickener; a low molecular weight nonionic alkylphenol ethoxylate surfactant; and an alkylaryl sulfonate hydrotrope.

DETAILED DESCRIPTION OF THE INVENTION

It has been discovered that a thickened propylene glycol-based aircraft wing anti-icing formulation which includes a low molecular weight nonionic alkylphenol ethoxylate surfactant in combination with an alkylaryl sulfonate hydrotrope is particularly advantageous. When both of the latter compounds are used in the inventive formulation, a de-icing/anti-icing agent with improved rheological properties and holdover time is obtained. These properties allow this formulation to meet the requirements for an aircraft wing de-icer such as: (1) remaining on the wing for prolonged periods of time during freezing rain; (2) being shear stable to pumping and/or spraying; and (3) having a low viscosity at high shear rates which accompany high air speeds so that the anti-icing agent can be shed off of the wings. It will be appreciated that the anti-icing compositions of this invention have applications other than on airfoils; for example, they may be used on airport runways or vehicle roadways or the like.

The anti-icing compositions of the present invention unexpectedly give improvements in its ice prevention capability while retaining favorable rheology. Improved holdover times were obtained with the inclusion of small amounts of alkylaryl sulfonates which were found to function as hydrotropes. Inclusion of low molecular weight nonionic alkylphenol ethoxylate surfactants were discovered to improve performance even more. Low molecular weight ethoxylates (e.g. containing about 4.0 moles of ethylene oxide) performed significantly better than higher molecular weight ethoxylates (9.5 moles ethylene oxide) at identical concentrations in the de-icer compositions.

ALKYLENE GLYCOLS

The largest single component of the anti-icing compositions of this invention is the alkylene glycol component, which may be up of one or more different alkylene glycols. For example, the alkylene glycol may be selected from ethylene glycol, propylene glycol, diethylene glycol, dipropylene glycol, and mixtures thereof, as examples only. Other alkylene glycols not specifically mentioned may also be useful. In some embodiments, the alkylene glycol component is at least 50%, but not more than about 65% by weight of the total anti-icing composition. In a preferred embodiment, the alkylene glycol component ranges from about 50 to 55 wt. %, based on the total composition.

In one embodiment of this invention, the formulation is based on propylene glycol as the anti-freeze component. However, the formulation could also include ethylene glycol, diethylene glycol or dipropylene glycol without adversely affecting the desirable properties of the fluid of this invention.

LOW MOLECULAR WEIGHT NONIONIC ALKYLPHENOL ETHOXYLATE SURFACTANTS

A low molecular weight nonionic alkylphenol ethoxylate surfactant is a required component of the anti-icing compositions of this invention. These surfactants have the formula:

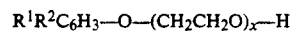

$$R^1R^2C_6H_3-O-(CH_2CH_2O)_x-H$$

where $R^1$ is $C_nH_{(2n+1)}$ where n has an average value that ranges from about 8 to about 12; where $C_6H_3$ is a substituted benzene ring and x has an average value that ranges from about 1 to about 10, preferably x ranges from about 1 to about 8, and most preferably from about 3 to about 8. Here, x denotes the average number of moles of ethylene oxide added to the alkylphenol adduct. The distribution of the ethylene oxide addition may be broad, as in common alkylphenol ethoxylates, or narrow as in some "peaked" ethoxylates.

The amount of low molecular weight nonionic alkylphenol ethoxylate surfacant in the anti-icing composition should range between about 0.1 and about 1.0% by weight, preferably between about 0.4 to about 0.7%. A suitable low molecular weight nonionic surfactant is SURFONIC ® N-40 surfactant, a 4.0 EO adduct of nonylphenol made by Texaco Chemical Company. As will be shown, SURFONIC ® N-95 (the 9.5 mole EO adduct of nonyphenol) has a molecular weight too high to be used in this invention. However, SURFONIC ® N-60, with 6 moles of EO is also usable in this invention. It is expected that in some situations it will be desirable to use more than one surfactant. Indeed, mixtures of N-60 and N-40 are shown to be usable in this invention.

ALKYLARYL SULFONATE HYDROTROPES

A hydrotrope is understood to be a chemical which has the property of increasing the aqueous solubility of slightly soluble organic chemicals. A hydrotrope's ratio of charge to hydrophobic bulk is high. Suitable hydrotropes for this invention are alkylaryl sulfonates which serve as hydrotropes for the sparingly soluble low molecular weight nonionic alkylphenol ethoxylate surfactants, discussed above. Alkyl groups on the hydrotrope should be relatively short, of six carbon atoms or less. Acceptable alkylaryl sulfonate hydrotropes include, but are not necessarily limited to sodium, potassium and ammonium salts of the group of toluene sulfonate; xylene sulfonate; cumene sulfonate; naphthalene sulfonate and benezene sulfonates or any of the benzene or naphthalene sulfonates which have been mono- or disubstituted with hydrocarbon chains having six or less carbon atoms. Other hydrotropes which will make the nonionic surfactants of this invention compatible with the thickened propylene glycol formulation of this invention should be understood to be within the scope of this invention. These include, but are not limited to, dicarboxylic acids having short alkyl chains of six or less carbon atoms; alkylated and dialkylated diphenyloxide disulfonates having short alkyl chains of six or less carbon atoms; phosphate esters with short hydrocabon chains ($\leq 8$ carbons), such as aliphatic alcohol or alkylphenol, e.g., and mixtures thereof.

The alkylaryl sulfonate hydrotrope is present in an amount between about 0.001 meq to about 0.01 meq per gram of the total formulation. Preferably, the alkylaryl sulfonate hydrotrope is present in a proportion of from about 0.002 meq/g to about 0.006 meq/g. It is anticipated that in some formulations it will be desirable to use more than one hydrotrope.

OPTIONAL ALCOHOL ETHOXYLATE NONIONIC SURFACTANTS

It is anticipated that an optional ingredient of the inventive antifreeze compositions will be a nonionic alcohol surfactant that can improve wetting of the aircraft surface. The surfactant should not contribute to excessive foaming of the composition. In one embodiment, the surfactant is employed at a level of between about 0.1 to about 0.5% by weight, based on the total compositions. Suitable surfactants include, but are not necessarily limited to, ethoxylates of long chain aliphatic alcohols, block copolymers of ethylene oxide and propylene oxide and related nonionic surfactants, and mixtures thereof. In one embodiment, such optional alcohol ethoxylate nonionic surfactants have the formula:

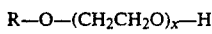

where R is $C_nH_{(2n+1)}$ where n has an average value that ranges from about 8 to about 18; and where x has an average value that ranges from about 1 to about 10. Here, x denotes the average number of moles of ethylene oxide added to the alkylphenol adduct. The distribution of the ethylene oxide addition may be broad, as in common alkylphenol ethoxylates, or narrow as in some "peaked" ethoxylates.

THICKENERS

Certain polymers and copolymers when used together as a thickener blend give desirable viscosity properties when using in anti-icing compositions, particularly in applications where high or consistent viscosity and/or pseudoplastic rheology is desired, such as in anti-icing compositions for aircraft where adherence to the airfoil surfaces, sometimes for long periods, is important. Such thickeners are described in detail in U.S. Pat. No. 5,118,435, incorporated by reference herein. It is anticipated that other thickeners may be useful in the compositions of this invention besides the thickener blends described herein.

The thickener blend is comprised of polymers of acrylic acid, both homo- and copolymers thereof. The thickener blend has at least two different polymers. It is preferred that the first polymer be polyacrylic acid. In some embodiments, the polyacrylic acid has a weight average molecular weight of between about 2,500,000 and about 3,500,000. The term polyacrylic acids as used herein also encompasses substituted polyacrylic acids. However, polyacrylic acid is sparingly soluble in the glycols used in this composition and while poly(meth)acrylic acid may also find use herein, some substituted polyacrylic acids may be too insoluble in the appropriate glycols for practical use. This polymer may be sightly cross-linked with a diene co-monomer at a cross-linked density of a low level which does not seriously affect its solubility in the anti-icing composition, but is high enough to help provide mechanical shear stability. Examples of suitable diene crosslinkers include, but are not necessarily limited to 1,3-butanediol diacrylate; 1,3-butanediol dimethacrylate; 1,4-butanediol diacrylate; 1,4-butanediol dimethacrylate; 1,6-hexanediol diacrylate; 1,6-hexanediol dimethacrylate; diethylene glycol diacrylate; diethylene glycol dimethacrylate; triethylene glycol diacrylate; tetraethylene glycol diacrylate; divinyl benzene and mixtures thereof Examples of the first thickener component include, but are not necessarily limited to, CARBOPOL® 672 and CARBOPOL® 934 polyacrylic acids made by B. F. Goodrich Co.

The second polymer of the thickener blend may be a copolymer of acrylic acid, or derivatives thereof, and a hydrophobic vinyl monomer. This second polymer may also be referred to as a hydrophobic modifier. The acrylic acid portion of the comonomer may include substituted acrylic acid, for example methacrylic acid in particular, but also possibly methyl acrylate, 2-hydroxyethyl acrylate, 2-hydroxyethyl methacrylate, hexyl acrylates, and mixtures thereof. The vinyl monomer may be any suitable unsaturated hydrophobic vinyl-type monomer, including, but not limited to, n-decyl acrylate; n-decyl methacrylate; isodecyl acrylate; isodecyl methacrylate; Lauryl acrylate; Lauryl methacrylate; n-octyl acrylate; n-octyl methacrylate; 2-ethylhexyl acrylate; 2-ethylhexyl methacrylate; and mixtures thereof. The homopolymer of acrylic acid and the copolymer of acrylic acid with a hydrophobic vinyl monomer may be made by any of the suitable known additional polymerization techniques, such as by initiation with a suitable free radical initiator. Examples of these hydrophobic modifier copolymers include but are not necessarily limited to Carbopol® 1610, 1621 and 1622 thickeners made by B. F. Goodrich Co.

The thickener component may be present in the anti-icing or antifreeze compositions in an amount from about 0.2 to about 0.8% by weight, preferably from about 0.26 to about 0.48% by weight. In one embodiment of the invention, from about 65 to about 98% of the thickener component or blend is the polyacrylic acid, whereas from about 2 to about 35% by weigh of the blend is the copolymer of acrylic acid and the hydrophobic vinyl monomer. In one embodiment of the invention, the preferred range is from about 75 to 95% of the thickener blend as the polyacrylic acid, and about 5 to 25% of the thickener blend is the copolymer of acrylic acid (or derivatives thereof) and the hydrophobic vinyl monomer. In a most preferred range, from about 80 to 90% of the thickener blend as the polyacrylic acid, and about 10 to 20% of the thickener blend is the copolymer of acrylic acid (or derivatives thereof) and the hydrophobic vinyl monomer. It will be understood that these formulations are complex mixtures which interact in unpredictable ways. It should be understood that suitable amounts and proportions of these and subsequently discussed compounds cannot be specified with precision since workable compositions depend not only on the amounts of the various components, but also on their exact chemical structures and properties.

NEUTRALIZING AGENTS

It is preferred that a neutralizing agent also be used in conjunction with the polyacrylic acid homo- and copolymers, if these are the thickeners employed, to at least partially neutralize them. The neutralizing agent may be selected from the group of alkali metal hydroxides, organic amine bases and mixtures thereof. A corrosion inhibitor, discussed below may also be useful as a neutralizing agent. The quantity of neutralizing agent required is determined by molecular weight of the agent and the quantity of the polyacrylic acid employed in a specific formula and the amount of free acid groups possessed by the polymers. In general, the base neutralizing agent is needed to neutralize from about 20 to about 90% of the carboxylic acid groups in the thickener blend. Preferably, sufficient base is present to neutralize 30 to 80% of the carboxylic groups.

CORROSION INHIBITORS

A corrosion inhibitor is also preferred, but optional, as part of the antifreeze composition. The corrosion inhibitor may be any of those conventionally used in the art of aircraft anti-icing compositions, and in one embodiment is preferred to be an alkaline metal salt of tolyltriazole or an alkaline metal salt of benzotriazole or mixtures thereof, to list only a few examples. The corrosion inhibitor also helps prevent the glycols from possible combustion under the influence of an open electrical charge. In another embodiment of the invention, the corrosion inhibitor is present from about 0.2 to about 0.5% by weight of composition, and may also serve to neutralize the polyacrylic acids of the thickener blends.

WATER

As is conventional, de-ionized water provides the balance of these anti-icing compositions. Deionized water may be used to dilute the composition, if necessary for deicing purposes.

FORMULATING PROCESS

The anti-icing compositions of this invention may be made simply by blending the above-noted components as desired. Two general methods may be used. In the first, the one-step process, the anti-icing composition is made directly by blending the desired components in ratios necessary for the needed properties. While having the advantage of being simple, very often adjustments must be made in the formula by an iterative process of trial and error before an optimized formulation is arrived at.

Alternatively, a first composition may be made using the desired components which will have a first viscosity. Subsequently, a second composition may be made using the same components, but in different proportions giving a second viscosity different from the first viscosity of the first composition. Generally, if the first viscosity is lower (or higher) than that desired in the final anti-icing compositions, the proportions of the appropriate components are changed to give a second viscosity in the second composition higher (or lower) than the first viscosity. Finally, the first composition and the second composition are blended together to give a final anti-icing composition with the desired components and the desired, target viscosity (a third viscosity intermediate to and different from the first and second viscosities). It is apparent that the component proportions adjusted between the first and second compositions modify their viscosities, e.g. thickener proportion, thickener composition (when a blend of two thickeners is used), alkali metal hydroxide and water, etc.

It is further apparent that once sufficient experience is gained forming certain final anti-icing compositions using the two step process, that one of ordinary skill in the art would find it easier to efficiently determine a non-step process to form an optimized formulation.

The compositions of the invention have been found to retain a high viscosities as they are diluted with water. This characteristic is unexpected for these formulations. Additionally, the compositions have exhibited a highly pseudoplastic theology, indicating that they possess desirable flow off characteristics. That is, the compositions will be retained on the aircraft surfaces for sufficiently long periods, but will liquify under relatively high shear. The viscosity under low shear conditions for these materials is relatively insensitive to temperature changes between about $-25°$ C. and about $20°$ C. This feature will allow a relatively predictable thickness of the fluid to be applied to the aircraft and lead to predictability in holdover time over a wide range of temperatures.

Indeed, the holdover times for the inventive formulations, after they have been sheared to the requirement of the standard test, are at least 30 minutes. As will be demonstrated, compositions without the combination of the low molecular weight nonionic alkylphenol ethoxylate surfactant and alkylaryl sulfonate hydrotrope of this invention have holdover times less than 30 minutes. It is important that anti-icing compositions be as stable as possible between application and aircraft departure, even if this is a long time period under adverse conditions. The anti-icing compositions also have the important property of being stable after such shearing effects of pumping and spraying, but will still readily flow off an airfoil under high shear conditions. The materials of this invention show good properties for the needed stability in these environments. Indeed, they meet the shear stability requirements and holdover time requirements of the Draft #6 SAE ref J89A2 "Proposed Aerospace Material Specification for Fluid, Aircraft Deicing/Anti-Icing (SAE Type 11)" (Section 3.2.4 "Anti-icing Performance"), the next generation of more stringent specifications expected to be adopted soon for these materials in the USA (incorporated by reference herein). These specifications have already been adopted in Europe.

The invention will be further illustrated with reference to the following Examples.

EXAMPLE 1

A composition consisting of: 3% aqueous solution of CARBOPOL ® 672 and 1621 polyacrylic acid resins in an 85:15 ratio (68.0 g); propylene glycol (308.5 g); CO-BRATEC ® TT-50S tolyltriazole solution (corrosion inhibitor/neutralizing agent/combustion inhibitor) made by PMC Specialties Group (Cincinnati, Ohio), (3.0 g); SURFONIC ® N-40 (2.4 g); 2% aqueous solution of NaOH (22.0 g); 2% aqueous solution of sodium xylene sulfonate hydrotrope (NaXS) (31.2 g); and deionized water (164.9 g) was prepared. The viscosity of this blend was 5400 cP at 0° C., 0.3 rpm on Brookfield spindle SC4-31/13R. Another blend was prepared with the same amounts except that 2.0 g of the 2% NaOH were replaced with deionized water. This gave a 6300 cP blend under the same conditions. These two blends were combined until a 6000 cP blend at 0° C. was derived. The resulting product was slightly cloudy, colorless solution.

The shear stability, rheological properties and anti-icing performance were determined using the procedures described in Draft #6 SAE ref J89A2 "Proposed Aerospace Material Specification for Fluid, Aircraft Deicing/Anti-Icing (SAE Type 11)". Tables I and II show how the blend's viscosity varies with temperature, shear rate, and water dilution. The mechanical stability of the fluid in this example is evident by comparing the viscosity behavior at 0° C. of the unsheared fluid Table I and that of the sheared fluid at 0% water dilution in Table II. The shearing test simulates the type of shearing that might occur during pumping and spraying of these materials.

TABLE I

Example 1 - Unsheared Fluid
Viscosity (cP) as a Function of Temperature

| Temp. °C. | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| +20 | 7800 | 4900 | 2820 | 1920 | 1350 | 978 | 650 |
| 0 | 6000 | 4300 | 2890 | 2170 | 1680 | 1320 | 890 |
| −10 | 5500 | 4300 | 3240 | 2660 | 2190 | 1790 | — |
| −20 | 2000 | 1600 | 1300 | 1120 | 940 | 782 | 640 |

TABLE II

Example 1 - Unsheared Fluid (except*)
Viscosity (cP) as a Function of Water Dilution at 0° C.

| Water, % | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| 0* | 5700 | 4000 | 2680 | 2040 | 1560 | 1230 | 917 |
| 5 | 9600 | 6420 | 4120 | 3060 | 2330 | 1800 | — |
| 15 | 15700 | 10600 | 6740 | 4800 | 3420 | 2480 | — |
| 25 | 23600 | 16300 | 9990 | 6740 | 4550 | — | — |

The sheared anti-icing agent of this Example had an average holdover time in freezing rain conditions of 36.92 minutes. A commercially available anti-icing agent, Kilfrost ABC-3, made by Kilfrost Ltd. (Northumberland, UK) had an average holdover time of approximately 32 minutes under the same conditions.

EXAMPLE 2

A composition was prepared as in Example 1, except that only 60 g of the 3% aqueous solution of CARBOPOL® 672 and 1621 polyacrylic acid resins in the same ratio as before; 6.2 g of 2% aqueous solution of NaOH; and 196.4 g of de-ionized water were used. This gave a 1600 cP blend at 0° C., 0.3 rpm on the same spindle as in Example 1. A second blend was prepared with the same amounts except that 1.5 g of the 2% NaOH was replaced with de-ionized water. This gave a 11,300 cP blend. These two blends were combined until a 5900 cP blend at 0° C. was derived.

Properties were measured as before, Tables III and IV show how the blend's viscosity varies with temperature, shear rate, and water dilution. The mechanical stability of the fluid in this example is evident by comparing the viscosity behavior at 0° C. of the unsheared fluid in Table III and that of the sheared fluid at 0% water dilution in Table IV.

TABLE I

Example 1 - Unsheared Fluid
Viscosity (cP) as a Function of Temperature

| Temp. °C. | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| +20 | 6200 | 4000 | 2340 | 1610 | 1140 | 825 | 555 |
| 0 | 5900 | 4200 | 2760 | 2050 | 1570 | 1230 | 910 |
| −10 | 4400 | 3400 | 2560 | 2180 | 1870 | 1560 | — |
| −20 | 1800 | 1600 | 1300 | 1120 | 950 | 800 | 673 |

TABLE II

Example 1 - Unsheared Fluid (except*)
Viscosity (cP) as a Function of Water Dilution at 0° C.

| Water, % | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| 0* | 5200 | 3700 | 2460 | 1880 | 1440 | 1130 | 845 |
| 5 | 9000 | 6100 | 3800 | 2790 | 2120 | 1660 | — |
| 15 | 17000 | 11000 | 6720 | 4780 | 3480 | — | — |
| 25 | 22400 | 15400 | 9580 | 6530 | 4420 | — | — |

The sheared anti-icing agent of this Example had an average holdover time in freezing rain conditions of 32.8 minutes.

EXAMPLE 3

A composition was prepared as in Example 1, except that the CARBOPOL® 672 to 1621 ratio was 95:5; 313.5 g of propylene glycol; 17 g of 2% aqueous solution of NaOH; and 166.9 g of deionized water were used. This gave a 5300 cP blend under the same conditions as before. A second blend was prepared with the same amounts but 3.0 g of the 2% NaOH was replaced with de-ionized water. This gave a 7000 cP blend. These two blends were combined until a 6000 cP blend at 0° C. was derived.

Tables V and VI show how the blend's viscosity varies with temperature shear rate, and water dilution. The mechanical stability of the fluid in this example is evident by comparing the viscosity behavior at 0° C. of the unsheared fluid in Table V and that of the sheared fluid at 0% water dilution in Table VI.

TABLE I

Example 1 - Unsheared Fluid
Viscosity (cP) as a Function of Temperature

| Temp. °C. | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| +20 | 6100 | 4000 | 2380 | 1670 | 1200 | 880 | 602 |
| 0 | 6000 | 4300 | 2930 | 2220 | 1730 | 1380 | — |
| −10 | 5900 | 4600 | 3460 | 2860 | 2360 | 1920 | — |
| −20 | 3200 | 2400 | 1800 | 1530 | 1260 | 1040 | 646 |

TABLE VI

Example 3 - Unsheared Fluid (except *)
Viscosity (cP) as a Function of Water Dilution at 0° C.

| Water, % | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| 0* | 5900 | 4200 | 2840 | 2150 | 1670 | 1340 | — |
| 5 | 8700 | 6000 | 3860 | 2840 | 2160 | 1680 | — |
| 15 | 10800 | 7320 | 4660 | 3410 | 2580 | 1960 | — |
| 25 | 12400 | 8500 | 5490 | 4010 | 2920 | 2110 | — |

The sheared anti-icing agent of this Example had an average holdover time in freezing rain conditions of 32.33 minutes.

COMPARATIVE EXAMPLE 4

A composition consisting of a 3% aqueous solution of CARBOPOL® 672 to 1621 in a 95:5 ratio (64.2 g); COBRATEC® TT-50S (3.0 g); propylene glycol (310.9 g); 2% NaXS (3.5 g); 2% aqueous solution of NaOH (23.0 g); and de-ionized water (195.4 g) were used. Note that no low molecular weight nonionic alkylphenol ethoxylate surfactant was incorporated. The blend had a viscosity of 10,400 cP at 0° C. A second blend was prepared with the same amounts except that 0.6 g of the 2% NaXS and 4.0 g of 2% NaOH was substituted for some of the de-ionized water. This blend had a viscosity of 1200 cP at 0° C. The two blends were combined until a 6000 cP blend was derived.

Tables VII and VIII show how the blend's viscosity varies with temperature shear rate, and water dilution. The mechanical stability of the fluid in this example is evident by comparing the viscosity behavior at 0° C. of the unsheared fluid in Table VII and that of the sheared fluid at 0% water dilution in Table VIII.

TABLE VII

Comparative Example 4-Unsheared Fluid Viscosity (cP) as a Function of Temperature

| Temp. °C. | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| +20 | 5900 | 4000 | 2360 | 1670 | 1190 | 872 | 587 |
| 0 | 6000 | 4200 | 2800 | 2060 | 1550 | 1180 | 831 |
| −10 | 4200 | 3400 | 2480 | 1910 | 1540 | 1230 | 918 |
| −20 | 1900 | 1600 | 1300 | 1150 | 1010 | 874 | 728 |

TABLE VIII

Comparative Example 4-Unsheared Fluid (except*) Viscosity (cP) as a Function of Water Dilution at 0° C.

| Water, % | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| 0* | 5900 | 4200 | 2760 | 2030 | 1520 | 1150 | 819 |
| 5 | 8000 | 5550 | 3510 | 2530 | 1860 | 1390 | 962 |
| 15 | 12100 | 7850 | 4700 | 3290 | 2340 | 1690 | — |
| 25 | 10000 | 6780 | 4120 | 2880 | 2060 | 1480 | 980 |

The sheared anti-icing agent of this Example had an average holdover time in freezing rain conditions of only 27.88 minutes. This value is considerably less than those for the formulations of this invention found in Examples 1-3.

COMPARATIVE EXAMPLE 5

A Composition consisting of a 3% aqueous solution of CARBOPOL® 672 to 1621 in a 85.15 ratio of (68.0 g); COBRATEC® TT-50S (3.0 g); propylene glycol (308.5 g); SURFONIC® N-95 (2.4 g); 2% NaXS (6.2 g); 2% aqueous solution of NaOH (30.0 g); and de-ionized water (181.9 g) was prepared. Note that a relatively high molecular weight nonionic alkylphenol ethoxylate surfactant was incorporated (9.5 mole EO adduct of nonylphenol) instead of a low molecular weight one. The resulting blend had a viscosity of 5200 cP at 0° C.

Tables IX and X show how the blend's viscosity varies with temperature, shear rate, and water dilution. The mechanical stability of the fluid in this example is evident by comparing the viscosity behavior at 0° C. of the unsheared fluid in Table IX and that of the sheared fluid at 0% water dilution in Table X.

TABLE IX

Comparative Example 5-Unsheared Fluid Viscosity (cP) as a Function of Temperature

| Temp. °C. | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| +20 | 7800 | 5000 | 2880 | 1940 | 1350 | 960 | 628 |
| 0 | 5200 | 3800 | 2480 | 1860 | 1400 | 1070 | 763 |
| −10 | 1900 | 1600 | 1200 | 1050 | 875 | 732 | 582 |
| −20 | 600 | 650 | 600 | 550 | 510 | 470 | 421 |

TABLE X

Comparative Example 5-Unsheared Fluid (except*) Viscosity (cP) as a Function of Water Dilution at 0° C.

| Water, % | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| 0* | 5200 | 3700 | 2460 | 1830 | 1380 | 1060 | 759 |
| 5 | 12100 | 8000 | 4780 | 3330 | 2360 | 1710 | — |
| 15 | 17000 | 11000 | 6280 | 4250 | 2950 | 2080 | — |
| 25 | 17300 | 11200 | 6420 | 4310 | 2960 | 2070 | — |

The sheared anti-icing agent of this Example had an average holdover time in freezing rain conditions of only 21.67 minutes. This value is considerably less than those for the formulations of this invention found in Examples 1-3, and is even less than that of Example 4 which used no nonionic alkylphenol ethoxylate surfactant.

COMPARATIVE EXAMPLE 6

A composition consisting of a 3% aqueous solution of CARBOPOL® 672 to 1621 in a 95.5 ratio (64.2 g); propylene glycol (311.0 g); COBRATEC® TT-50S (3.0 g); SURFONIC® N-95 (3.0 g); 2% NaOH (27.9 g); and de-ionized water (190.9 g) was prepared. Note that no alkylaryl sulfonate hydrotrope was employed. The resulting blend had a viscosity of 6100 cP at 0° C.

Tables XI and XII show how the blend's viscosity varies with temperature, shear rate, and water dilution. The mechanical stability of the fluid in this example is evident by comparing the viscosity behavior at 0° C. of the unsheared fluid in Table XI and that of the sheared fluid at 0% water dilution in Table XII.

TABLE XI

Comparative Example 6 - Unsheared Fluid Viscosity (cP) as a Function of Temperature

| Temp. °C. | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| +20 | 5900 | 4000 | 2420 | 1710 | 1220 | 890 | 598 |
| 0 | 6100 | 4400 | 2900 | 2150 | 1620 | 1230 | 879 |
| −10 | 4400 | 3200 | 2380 | 1820 | 1520 | 1240 | 930 |
| −20 | 2100 | 1600 | 1300 | 1150 | 985 | 870 | 735 |

TABLE XII

Comparative Example 6 - Unsheared Fluid (except *) Viscosity (cP) as a Function of Water Dilution at 0° C.

| Water, % | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| 0* | 6100 | 4400 | 2860 | 2110 | 1590 | 1210 | 854 |
| 5 | 9600 | 6200 | 3920 | 2810 | 2040 | 1220 | — |
| 15 | 15100 | 10000 | 5680 | 3900 | 2730 | 1940 | — |
| 25 | 14600 | 9000 | 5480 | 3780 | 2640 | 1870 | — |

The sheared anti-icing agent of this Example had an average holdover time in freezing rain conditions of only 20.96 minutes. This value is considerably less than those for the formulations of this invention found in Examples 1-3, and is less than that for comparative Examples 4 and 5.

Table XIII gives a summary of freezing rain endurance tests of various formulations. These will serve to compare fluids that contain the additives of this invention to those which do not.

TABLE XIII

| Component | Freezing Rain Endurance Tests | | | | | |
|---|---|---|---|---|---|---|
| | Comparative | | | | Inventive | |
| Ex. → | 7 | 8 | 9 | 4 | 3 | 1 |
| PG (or EG) in DI H$_2$O | yes | yes | (yes) | yes | yes | yes |
| TT-50S[1] | yes | yes | yes | yes | yes | yes |
| CP 672/1621 (1610)[2] | (95/5) | 95/5 | 75/25 | 95/5 | 95/5 | 85/15 |
| Nonionic surfactant | N-95 | N-95 | N-95 | None | N-40 | N-40 |
| Wt. % Nonionic surf. | 0.5 | 0.5 | 0.5 | None | 0.4 | 0.4 |
| Hydrotrope | None | None | None | NaXS | NaXS | NaXS |
| Neutralizing agent | NaOH | NaOH | NaOH | NaOH | NaOH | NaOH |
| Holdover Time, min:sec. | 18:45 | 22:00 | 24:19 | 27:53 | 32:20 | 36:55 |

[1]Tolyltriazole.
[2]Carbopol ® polyacrylic acid resins.

COMPARATIVE EXAMPLE 10

A composition consisting of a 3% aqueous solution of CARBOPOL ® 672 to 1621 in a 95:5 ratio (64.2 g); propylene glycol (310.9 g); COBRATEC ® TT-50S (3.0 g); 2% NaOH (17.5 g); 6% sodium cumene sulfonate (8.6 g); and de-ionized water (195.8 g) was prepared. Note that no nonionic surfactant was employed. The resulting blend had a viscosity of 6000 cP at 0° C.

Tables IXV and XV show how the blend's viscosity varies with temperature, shear rate, and water dilution. The mechanical stability of the fluid in this example is evident by comparing the viscosity behavior at 0° C. of the unsheared fluid in Table XIV and that of the sheared fluid at 0% water dilution in Table XV.

TABLE XIV

Comparative Example 10 - Unsheared Fluid
Viscosity (cP) as a Function of Temperature

| Temp. °C. | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| +20 | 5700 | 3800 | 2320 | 1620 | 1180 | 872 | 589 |
| 0 | 6000 | 4200 | 2890 | 2200 | 1680 | 1300 | 952 |
| −10 | 4800 | 3800 | 2800 | 2320 | 1900 | 1540 | — |
| −20 | 2500 | 2100 | 1800 | 1580 | 1370 | 1180 | 983 |

TABLE XV

Comparative Example 10 - Unsheared Fluid (except*)
Viscosity (cP) as a Function of Water Dilution at 0° C.

| Water, % | RPM, Brookfield spindle SC4-31/13R | | | | | | |
|---|---|---|---|---|---|---|---|
| | 0.3 | 0.6 | 1.5 | 3.0 | 6.0 | 12.0 | 30.0 |
| 0 | 6000 | 4200 | 2800 | 2080 | 1570 | 1200 | 870 |
| 5 | 6500 | 4600 | 3080 | 2250 | 1680 | 1280 | 912 |
| 15 | 8200 | 5650 | 3520 | 2500 | 1830 | 1360 | 932 |
| 25 | 5600 | 3900 | 2630 | 1940 | 1480 | 1140 | 830 |

The sheared anti-icing agent of this Example had an average holdover time in freezing rain conditions of only 23.88 minutes. This value is considerably less than those for the formulations of this invention found in Examples 1-3, and is less than that for comparative Examples 4 and 5.

EXAMPLES 11-15

Different compositions were prepared with various nonionic surfactants of the SURFONIC ® N-Series nonylphenol ethoxylates, at various concentrations. The amount of propylene glycol anti-freeze was adjusted to accommodate the change in the amount of surfactant used. This change is indicated by x. These compositions were prepared by the same two-step procedure as described in earlier Examples.

The compositions consisted of 3% aqueous solution of CARBOPOL 672 and 1621 polyacrylic acid resins in an 85.15 ratio (68.0 g); variable propylene glycol (308.5−x g); COBRATEC TT-50S tolyltriazole solution (3.0 g); variable amounts of various nonionic surfactants of the SURFONIC N-Series nonylphenol ethoxylates (2.4+x g); 2% aqueous solution of NaOH (22.0 g); 2% aqueous solution of sodium xylene sulfonate (NaXS) (31.2 g); and de-ionized water (164.9 g). Viscosities of these compositions under different relevant conditions, the percent degradation in their viscosities after shearing and the holdover times of the sheared fluids in the respective freezing rain tests are given in Table XVI.

EXAMPLE 16

The same composition as was given in Example 1 was prepared in a one-step procedure. This meant that a high viscosity composition and a low viscosity composition were prepared to be blended together for the right viscosity. The one-step procedure would simplify practical manufacturing operations. Viscosities of this composition under different relevant conditions, the percent degradation in its viscosity after shearing and its holdover time in the freezing rain test are given in Table XVI. This information is given in Table XVII along with the same data for the same composition prepared by the two-step procedure for comparative purposes. This data clearly indicates that the one-step procedure is capable of generating a composition of equivalent performance.

TABLE XVI

Effects of Different Proportions of Various Surfactants on Properties

| | Nonionic Surfactant SURFONIC N | | Viscosity at Temperature/ Water Dilution/ Rotational Speed/ | | | Mech. | |
|---|---|---|---|---|---|---|---|
| | | | −20° C. 0% | −10° C. 25% | −20° C. 25% | Stability, % Degradation | Holdover |
| Ex. | Type | wt. % | 0.3 rpm | 30 rpm | 30 rpm | due to shear | Time, min.* |
| 16 | N-40 | 0.4 | 2000 | — | — | 10 | 35.25 |
| 11 | (1/1) N-40/N-60 | 0.4 | 1700 | 1600 | 1800 | 10 | 33.5 |

TABLE XVI-continued

Effects of Different Proportions of Various Surfactants on Properties

| Ex. | Nonionic Surfactant SURFONIC N Type | wt. % | Viscosity at Temperature/ Water Dilution/ Rotational Speed/ −20° C. 0% 0.3 rpm | −10° C. 25% 30 rpm | −20° C. 25% 30 rpm | Mech. Stability, % Degradation due to shear | Holdover Time, min.* |
|---|---|---|---|---|---|---|---|
| 12 | (1/1) N-40/N-60 | 0.51 | 1500 | 1500 | 1800 | 10 | 35.67 |
| 13 | (1/1) N-40/N-60 | 0.62 | 1200 | 1600 | 2000 | 13 | 40.94 |
| 14 | (1/1) N-60/N-85 | 0.4 | 1500 | 1500 | — | 14 | 19.67 |
| 15 | N-85 | 0.4 | 1800 | 1400 | — | 10 | 20.5 |

*All fluids were sheared prior to testing.

It will be appreciated that the incorporation of a relatively higher molecular weight nonionic alkylphenol ethoxylate surfactant either as the only surfactant (Ex. 15) or as part of a mixture of surfactants (Ex. 14) gives noticeably reduced holdover times, of about 20 minutes, as compared with holdover times exceeding 30 minutes (about 33 minutes or more) for the inventive Examples 16 and 11–13.

TABLE XVII

Effects of Different Proportions of Various Surfactants on Properties

| Ex. | Nonionic Surfactant SURFONIC N Type | wt. % | Viscosity at Temperature/ Water Dilution/ Rotational Speed/ −20° C. 0% 0.3 rpm | −10° C. 25% 30 rpm | −20° C. 25% 30 rpm | Mech. Stability, % Degradation due to shear | Holdover Time, min.[1] |
|---|---|---|---|---|---|---|---|
| 16[2] | N-40 | 0.4 | 2000 | — | — | 10 | 35.25 |
| 1[3] | N-40 | 0.4 | 2000 | 2700 | — | 5 | 36.92 |
| 17[4] | N-40 | 0.4 | 1600 | 3100 | — | 10 | 32.17 |

[1]All fluids were sheared prior to testing.
[2]Made using a one-step process.
[3]Made using a two-step process.
[4]Made using a two-step process.

Many modifications may be made in the process of this invention without departing from the spirit and scope thereof which are defined only in the appended claims. For example, one skilled in the art may discover that particular compounds or proportions thereof, which may not be explicitly recited herein, but which are nevertheless anticipated, would give desirable results. A certain combination of low molecular weight nonionic alkylphenol ethoxylate surfactants and/or a combination of alkylaryl sulfonate hydrotropes may be found to have particular advantages. It will also be appreciated that the anti-icing compositions may also find uses as de-icers, and that surfaces other than airfoils could also be treated with these materials, such as vehicle windshields and exposed stationary surfaces that need to be free from ice.

We claim:

1. An anti-icing composition at least 50 percent of:
an alkylene glycol component;
a thickener;
a low molecular weight nonionic alkylphenol ethoxylate surfactant; and about 0.001 meq/g of
an alkylaryl sulfonate hydrotrope, where the alkyl group has six carbons or less.

2. The anti-icing composition of claim 1 where the alkylene glycol component is selected from the group consisting of ethylene glycol, propylene glycol, diethylene glycol, dipropylene glycol and mixtures thereof.

3. The anti-icing composition of claim 1 wherein the alkylene glycol component is propylene glycol and is present in an amount between about 50 and 65% by weight of the anti-icing composition.

4. The anti-icing composition of claim 1 where the thickener is a thickener blend comprising:
at least one polyacrylic acid and
at least one copolymer of acrylic acid and a hydrophobic vinyl monomer;
where the anti-icing composition further comprises a neutralizing agent to at least partially neutralize the carboxylic acid groups in the thickener blend.

5. The anti-icing composition of claim 4 where the neutralizing agent is selected from the group consisting of alkali metal hydroxides, organic amine bases and mixtures thereof.

6. The anti-icing composition of claim 4 where an effective amount of the neutralizing agent is present to neutralize between about 20 to 90 wt. % of the carboxylic acid groups present in the thickener blend.

7. The anti-icing composition of claim 4 where the polyacrylic acid has a weight average molecular weight of between about 2,500,000 and about 3,500,000, and where the polyacrylic acid is partially cross-linked by a diene co-monomer.

8. The anti-icing composition of claim 4 where the thickener blend comprises from about 65 to about 98% by weight of the polyacrylic acid and from about 2 to about 35% by weight of the copolymer of acrylic acid and the vinyl monomer.

9. The anti-icing composition of claim 1 where the thickener is present in an amount between about 0.2 and about 0.8% by weight of the anti-icing composition.

10. The anti-icing composition of claim 1 where the low molecular weight nonionic alkylphenol surfactant is present in an amount between about 0.1 and about 1.0% by weight of the anti-icing composition.

11. The anti-icing composition of claim 1 where the low molecular weight nonionic alkylphenol surfactant has the formula:

$$R^1R^2C_6H_3-O-(CH_2CH_2O)_x-H$$

where $R^1$ is $C_nH_{(2n+1)}$ where n has an average value that ranges from about 8 to 12; where $R^1$ is H or $C_nH_{((2n+1)}$ where n has an average value that ranges from about 8 to about 12; where $C_6H_3$ is a substituted benzene ring and x has an average value that ranges from about 1 to about 10.

12. The anti-icing composition of claim 1 where the alkylaryl sulfonate hydrotrope is selected from the group consisting of sodium, potassium and ammonium salts of the group of toluene sulfonate; xylene sulfonate; cumene sulfonate; naphthalene sulfonate and benzene sulfonates mono- or disubstituted with hydrocarbon chains having six to less carbon atoms; alkylate and dialkylated diphenyloxide disulfonates having short alkyl chains of six or less carbon atoms.

13. The anti-icing composition of claim 1 where the anti-icing composition is made by a process comprising the steps of:
   forming a first composition having a first viscosity by adding together components comprsing:
   an alkylene glycol component;
   a thickener;
   a low molecular weight nonionic alkylphenol ethoxylate surfactant; and
   an alkylaryl sulfonate hydrotrope, where the alkyl group has six carbons or less;
   each component being added at a first proportion;
   forming a second composition having a second viscosity different from the first viscosity by adding together components comprising:
   an alkylene glycol component;
   a thickener;
   a low molecular weight nonionic alkylphenol ethoxylate surfactant; and
   an alkylaryl sulfonate hydrotrope, where the alkyl group has six carbons or less;
   each component being added at a second proportion, where at least one second proportion of at least one of the components is different from the first proportion of said component; and
   blending together the first composition and the second composition to form the anti-icing composition which has a third viscosity different from the first viscosity and the second viscosity.

14. An anti-icing composition comprising:
an alkylene glycol component;
a thickener;
between about 0.1 and about 1.0% by weight of a low molecular weight nonionic alkylphenol ethoxylate surfactant having the formula:

$$R^1R^2C_6H_3-O-(CH_2CH_2O)_x-H$$

where $R^1$ is $C_nH_{(2n+1)}$ where n has an average value that ranges from about 8 to about 12; where $R^1$ is H or $C_nH_{(2n+1)}$ where n has an average value that ranges from about 8 to about 12; where $C_6H_3$ is a substituted benzene ring and x has an average value that ranges from about 1 to about 10; and
between about 0.001 meq/g composition to about 0.01 meq/g composition of an alkylaryl sulfonate hydrotrope selected from the group consisting of sodium, potassium and ammonium salts of the group of toluene sulfonate; xylene sulfonate; cumene sulfonate; naphthalene sulfonate and benzene sulfonates mono- or disubstituted with hydrocarbon chains having six or less carbon atoms; alkylated and dialkylated diphenyloxide disulfonates having short alkyl chains of six or less carbon atoms.

15. The anti-icing composition of claim 14 where the alkylene glycol component is present in an amount between about 50 and about 65% by weight of the anti-icing composition, and is selected from the group consisting of ethylene glycol, propylene glycol, diethylene glycol, dipropylene glycol and mixtures thereof.

16. The anti-icing composition of claim 14 where the thickener is a thickener blend comprising:
   at least one polyacrylic acid having a weight average molecular weight of between about 2,500,000 and about 3,500,000, and where the polyacrylic acid is partially cross-linked by a diene co-monomer; and
   at least one copolymer of acrylic acid and a hydrophobic vinyl monomer; and
   the anti-icing composition further comprises a neutralizing agent to at least partially neutralize between about 20 to 90 wt. % of the carboxylic acid groups in the thickener blend, where the neutralizing agent is selected from the group consisting of alkali metal hydroxides, organic amine bases and mixtures thereof.

17. The anti-icing composition of claim 16 where the thickener blend comprises from about 65 to about 98% by weight of the polyacrylic acid and from about 2 to about 35% by weight of the copolymer of acrylic acid and the vinyl monomer.

18. The anti-icing composition of claim 14 where the thickener is present in an amount between about 0.2 and about 0.8% by weight of the anti-icing composition.

19. The anti-icing composition of claim 14 where the composition additionally comprises other components selected from the group consisting of a corrosion inhibitor, a nonionic surfactant, de-ionized water and mixtures thereof.

20. The anti-icing composition of claim 14 where the anti-icing composition is made by a process comprising the steps of:
   forming a first composition having a first viscosity by adding together components comprising:
   an alkylene glycol component;
   a thickener;
   a low molecular weight nonionic alkylphenol ethoxylate surfactant; and
   an alkylaryl sulfonate hydrotrope, where the alkyl group has six carbons or less;
   each component being added at a first proportion;
   forming a second composition having a second viscosity different from the first viscosity by adding together components comprising:
   an alkylene glycol component;
   a thickener;
   a low molecular weight nonionic alkylphenol ethoxylate surfactant; and
   an alkylaryl sulfonate hydrotrope, where the alkyl group has six carbons or less;
   each component being added at a second proportion, where at least one second proportion of at least one of the components is different from the first proportion of said component; and
   blending together the first composition and the second composition to form the anti-icing composition which had a third viscosity different from the first viscosity and the second viscosity.

21. An anti-icing composition comprising:

between about 50 and about 65% by weight of an alkylene glycol glycol, propylene glycol, diethylene glycol, dipropylene glycol and mixtures thereof;

between about 0.2 and about 0.8 % by weight of a thickener blend comprising:

about 65 to about 98% of the thickener blend being at least one polyacrylic acid having a weight average molecular weight of between about 2,500,000 and about 3,500,000, and where the polyacrylic acid is partially cross-linked by a diene co-monomer; and about 2 to about 35% by weight of the thickener blend being at least one copolymer of acrylic acid and a hydrophobic vinyl monomer; and a neutralizing agent to at least partially neutralize between about 20 to 90 wt. % of the carboxylic acid groups in the thickener blend, where the neutralizing agent is selected from the group consisting of alkali metal hydroxides, organic amine bases and mixtures thereof;

between about 0.1 and about 1.0% by weight of a low molecular weight nonionic alkylphenol ethoxylate surfactant having the formula:

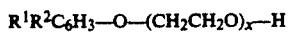

where $R^1$ is $C_nH_{(2n+1)}$ where n has an average value that ranges from about 8 to about 12; where $R^1$ is H or $C_nH_{(2n+1)}$ where n has an average value that ranges from about 8 to about 12; where $C_6H_3$ is a substituted benzene ring and x has an average value that ranges from about 1 to about 10; and between about 0.001 meq/g composition to about 0.01 meq/g composition of an alkylaryl sulfonate hydrotrope selected from the group consisting of sodium, potassium and ammonium salts of the group of toluene sulfonate; xylene sulfonate cumene sulfonate; naphthalene sulfonate and benzene sulfonates mono- or disubstituted with hydrocarbon chains having six or less carbon atoms; alkylated and dialkylated diphenyloxide disulfonates having short alkyl chains of six or less carbon atoms.

22. The anti-icing composition of claim 21 additionally comprising other components selected from the group consisting of a corrosion inhibitor, a nonionic surfactant, de-ionized water and mixtures thereof.

* * * * *